United States Patent [19]
Gray et al.

[11] Patent Number: 5,450,819
[45] Date of Patent: Sep. 19, 1995

[54] SCRATCH AND STRETCH FOR CATS

[76] Inventors: Douglas O. Gray, 243 Mason Dr., Manhasset, N.Y. 11030; George Spector, 233 Broadway Rm 702, New York, N.Y. 10279

[21] Appl. No.: 237,130

[22] Filed: May 3, 1994

[51] Int. Cl.[6] .............................................. A01K 29/00
[52] U.S. Cl. ................................................... 119/706
[58] Field of Search ............... 119/157, 706; 242/222, 242/613.1, 613.3

[56] References Cited

U.S. PATENT DOCUMENTS

| | | | |
|---|---|---|---|
| 2,048,300 | 7/1936 | Showers | 242/613.3 X |
| 3,885,752 | 5/1975 | Noffsinger | 242/613.3 X |
| 4,278,212 | 7/1981 | Wesley | 242/613.3 X |
| 5,067,440 | 11/1991 | Hatten et al. | 119/706 |

*Primary Examiner*—Robert P. Swiatek

[57] ABSTRACT

A cat scratching and stretching device, which consists of an elongated symmetrical shaped framework that can be free standing and mounted against a vertical flat surface. A length of strong rope is wrapped about the framework from one end to another. The framework with the strong rope is reversible front to back and top to bottom, offering four quadrants of use and wear when a cat claws on the strong rope.

3 Claims, 1 Drawing Sheet

SCRATCH AND STRETCH FOR CATS

BACKGROUND OF THE INVENTION

The instant invention relates generally to pet exercising equipment and more specifically it relates to a cat scratching and stretching device, which provides a structure for the cat to utilize instead of damaging other articles.

There are available various conventional pet exercising equipment which do not provide the novel improvements of the invention herein disclosed.

SUMMARY OF THE INVENTION

A primary object of the present invention is to provide a cat scratching and stretching device that will overcome the shortcomings of the prior art devices.

Another object is to provide a cat scratching and stretching device that can be utilized by a cat instead of the cat damaging walls, furniture or other similar supporting structures.

An additional object is to provide a cat scratching and stretching device that is impregnated with catnip, so that the cat will be attracted to the device and will release the catnip when using the device.

A further object is to provide a cat scratching and stretching device that is simple and easy to use.

A still further object is to provide a cat scratching and stretching device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
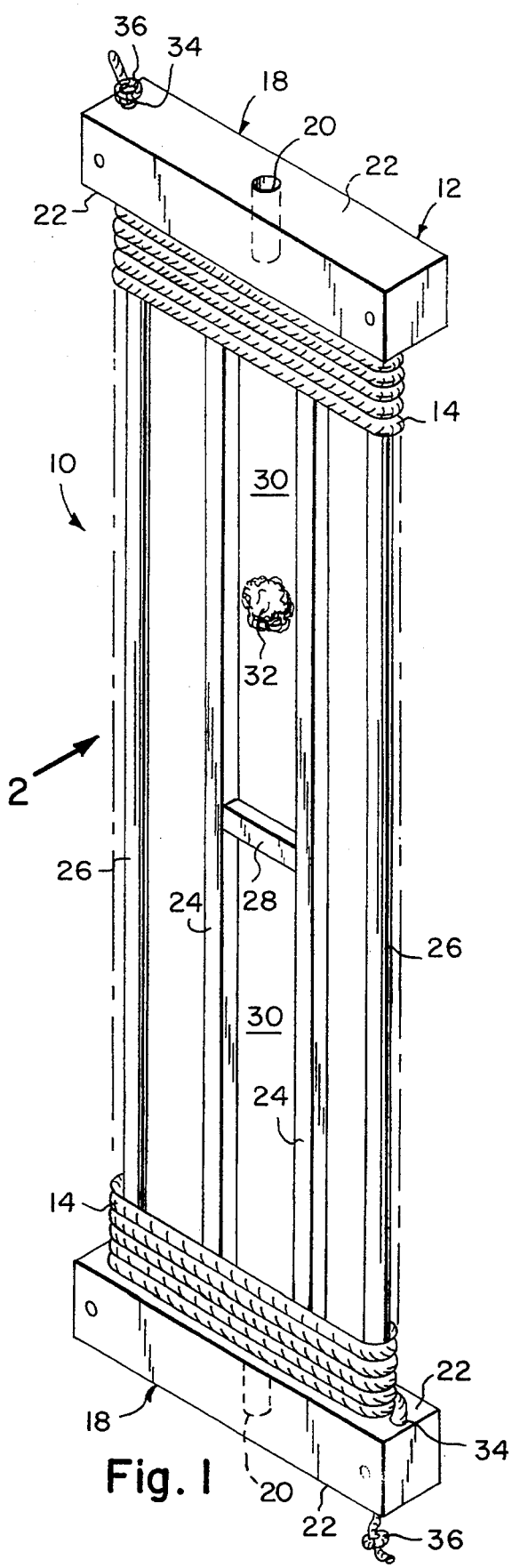
FIG. 1 is a perspective view of a first embodiment of the instant invention.
Figure 2:
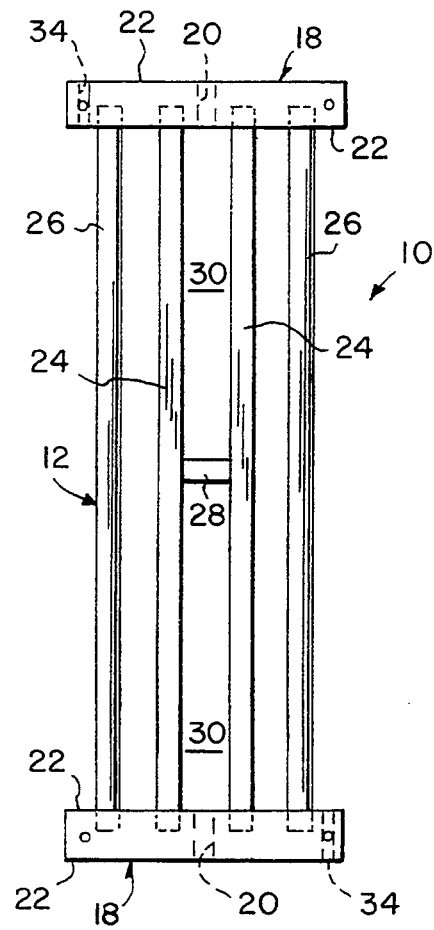
FIG. 2 is a front view taken in direction of arrow 2 in FIG. 1, with the strong rope removed therefrom.

Turning now descriptively to the drawings, in which similar reference characters denote similar elements throughout the several views, FIGS. 1 and 2 illustrate a cat scratching and stretching device 10, which consists of an elongated symmetrical shaped framework 12 that can be free standing and mounted against a vertical flat surface. A length of strong rope 14 is wrapped about the framework 12 from one end to another. The framework 12 with the strong rope 14 is reversible front to back and top to bottom, offering four quadrants of use and wear when a cat claws on the strong rope 14.

The framework 12 includes a pair of rectangular shaped blocks 18, each having a central hole 20 extending transversely between its long sides 22. A pair of long square shaped support bars 24 are mounted at each end and extend in a spaced parallel alignment between facing long sides 22 of the pair of blocks 18 on opposite sides of the central holes 20. A pair of long cylindrical shaped support rods 26 are mounted at each end and extend in a spaced parallel alignment between the facing long sides 22 of the pair of blocks 18 on opposite sides of the support bars 24.

A short spacer member 28 extends centrally at a right angle between the support bars 24, so as to divide the space between the support bars into two center channels 30, with the central holes 20 in the pair of blocks 18 for catnip 32, when the strong rope 14 is wrapped thereabout.

Each block 18 further has an end hole 34 extending transversely between its long sides 22 in a parallel relationship with the central hole 20. The opposite ends of the strong rope 14 can be inserted through each end hole 34 and tied at 36 to be retained thereto.

Figure 3:
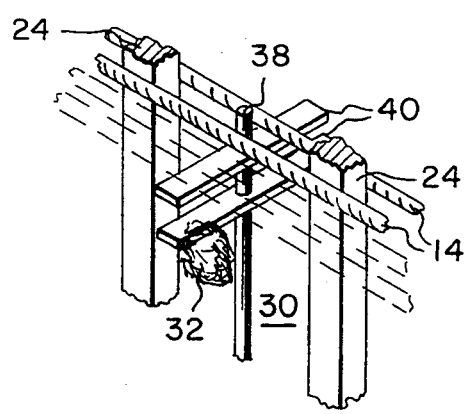
FIG. 3 is a partial perspective view of a second embodiment showing a plurality of flexible blade agitators in the center channel between the portions of the strong rope to mix up the catnip therein.

FIG. 3 shows a shaft 38 to fit into one of the center channels 30 between the support bars 24. A plurality of flexible flat blade agitators 40 are spaced apart and affixed centrally onto the shaft 38. The ends of the flat blade agitators 40 extend between the portions of the strong rope 14. When the cat claws at the flat blade agitators 40 in the strong rope 14, the catnip 32 will shake and stir back and forth within the center channel 30, to excite the cat to continue to claw at the strong rope 14.

OPERATION OF THE INVENTION

To use the cat scratching and stretching device 10, a pet owner can insert catnip 32 through the central holes 20 in the blocks 18. The framework 12 is then placed onto a floor or mounted against a vertical flat surface, such as a wall. The cat will now claw at the strong rope 14 wrapped thereabout.

If the device 10 has the shaft 38 with the flat blade agitators 40 in one of the center channels 30, the cat can now claw at the flat blade agitators 40 extending between portions of the strong rope 14, to stir up the catnip 32 to excite the cat.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A cat scratching and stretching device which comprises:
   a) an elongated symmetrical shaped framework that can be free standing and mounted against a vertical flat surface;
   b) a length of strong rope wrapped about said framework from one end to another, so that said framework with said strong rope is reversible from front to back and top to bottom, offering four quadrants of use and wear when a cat claws on said strong rope; wherein said framework includes:
   c) a pair of rectangular shaped blocks, each having a central hole extending transversely between its long sides;
   d) a pair of long square shaped support bars mounted at each end and extending in a spaced parallel alignment between facing long sides of said pair of blocks on opposite sides of the central holes;

e) a pair of long cylindrical shaped support rods mounted at each end and extending in a spaced parallel alignment between the facing long sides of said pair of blocks on opposite sides of said support bars and f) a short spacer member extending centrally at a right angle between said support bars, so as to divide the space between said support bars into two center channels with the central holes in said pair of blocks for catnip when said strong rope is wrapped thereabout.

2. A cat scratching and stretching device as recited in claim 1, wherein each said block further having an end hole extending transversely between its long sides in a parallel relationship with the central hole, so that the opposite ends of said strong rope can be inserted through each end hole and tied to be retained thereto.

3. A cat scratching and stretching device as recited in claim 2, further including:

a) a shaft to fit into one of the center channels between said support bars and b) a plurality of flexible flat blade agitators spaced apart and affixed centrally onto said shaft with the ends of said flat blade agitators extending between the portions of said strong rope, so that when the cat claws at said flat blade agitators in said strong rope, the catnip will shake and stir back and forth within the center channel, to excite the cat to continue to claw at said strong rope.

* * * * *